United States Patent
Yamada et al.

(10) Patent No.: US 6,551,434 B1
(45) Date of Patent: Apr. 22, 2003

(54) METHOD OF PRODUCING EXTRUSION-LAMINATED MEMBER

(75) Inventors: Koji Yamada, Fujisawa (JP); Akira Kobayashi, Chigasaki (JP); Yuji Funagi, Yokohama (JP)

(73) Assignee: Toyo Seikan Kaisha, Ltd., Tokyo (JP)

(*) Notice: Subject to any disclaimer, the term of this patent is extended or adjusted under 35 U.S.C. 154(b) by 242 days.

(21) Appl. No.: 09/698,192

(22) Filed: Oct. 30, 2000

(30) Foreign Application Priority Data

Oct. 29, 1999 (JP) ............................................ 11-310055

(51) Int. Cl.7 .................... B32B 31/08; B32B 31/12; B32B 31/20; B32B 31/30
(52) U.S. Cl. ...................... 156/244.23; 156/244.27; 156/498; 156/500
(58) Field of Search ................ 156/244.23, 244.27, 156/498, 500, 244.11; 427/318

(56) References Cited
U.S. PATENT DOCUMENTS 3,930,923 A * 1/1976 Elliott ............... 156/244.23 X
4,306,927 A * 12/1981 Funk et al. ......... 156/244.27 X

* cited by examiner

Primary Examiner—Adrienne C. Johnstone
(74) Attorney, Agent, or Firm—Sughrue Mion, PLLC

(57) ABSTRACT

A method of producing an extrusion-laminated member comprises extruding a thermoplastic resin from a T-die into the form of a film and laminating the film on a heated metallic base member using a pair of laminating rolls, wherein a pre-roll is disposed between the T-die and one of the laminating rolls to receive the film on the side opposite to the side that adheres onto the base member over the whole width of the film. The film is wound on the pre-roll at an angle ($\alpha$) of from 10 to 90 degrees. The film received by the pre-roll is fed to the laminating rolls, conveyed by being supported by the laminating rolls on the side opposite to the side that adheres onto the base member, and is fed to a nipping position so as to be melt-adhered onto the heated metallic base member.

9 Claims, 9 Drawing Sheets

COMPARATIVE

FIG.5 COMPARATIVE
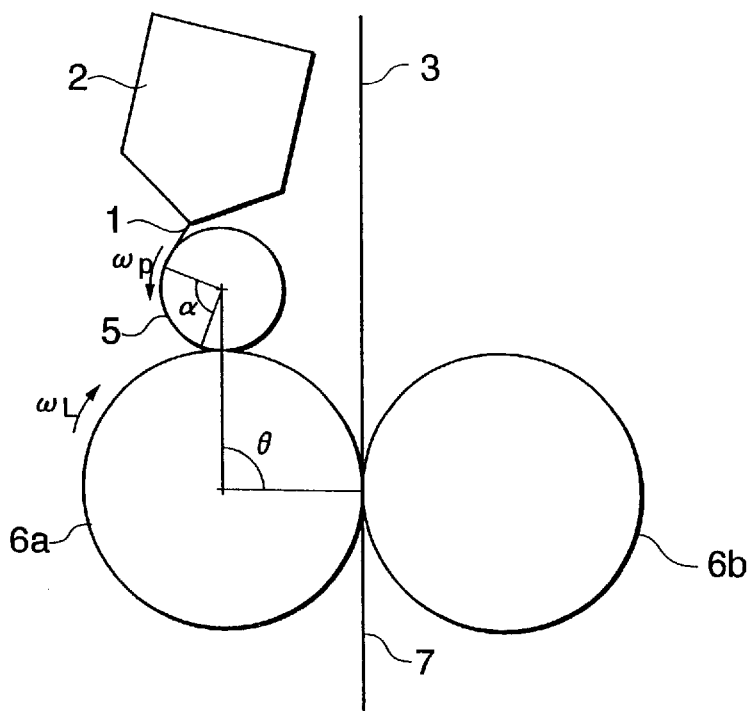
FIG.6
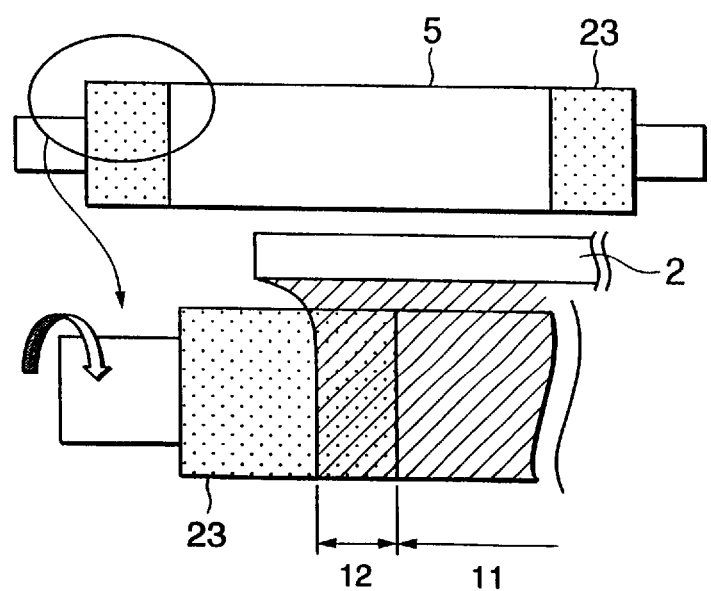

A-A CROSS SECTION

FIG.13
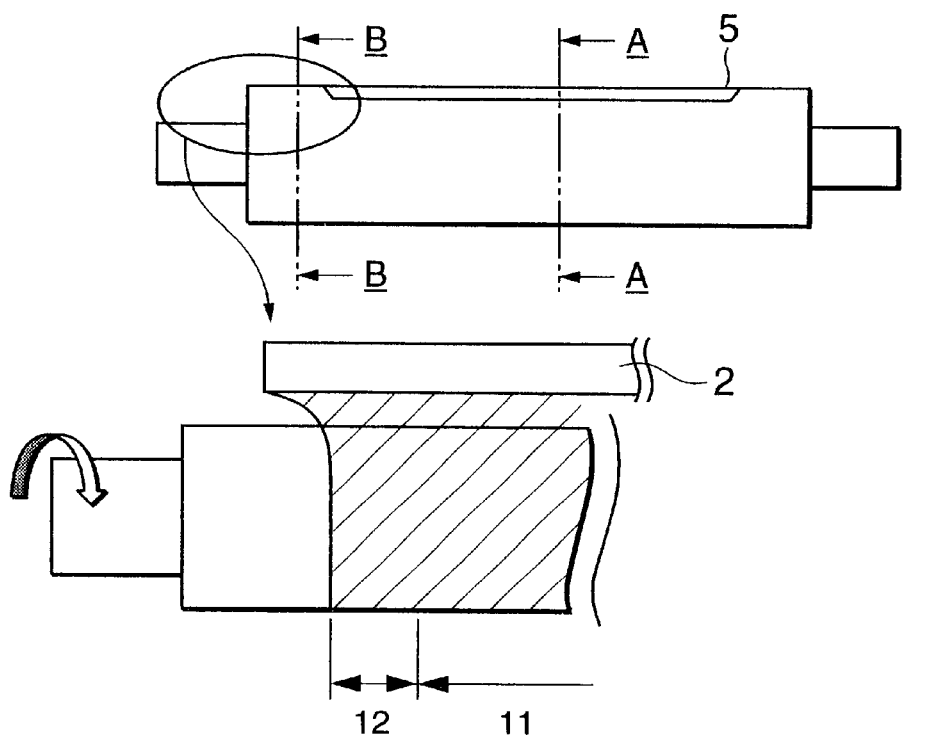
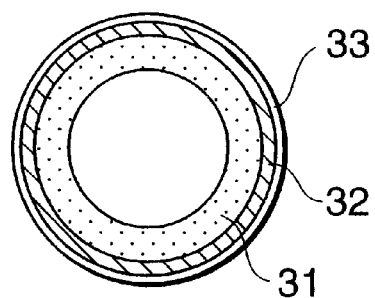
A-A CROSS SECTION
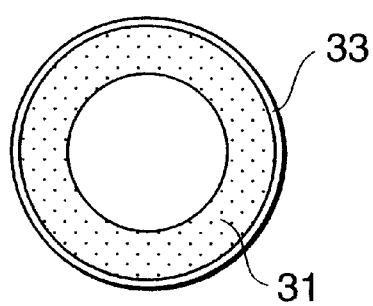
B-B CROSS SECTION

COMPARATIVE

METHOD OF PRODUCING EXTRUSION-LAMINATED MEMBER

BACKGROUND OF THE INVENTION

1. Field of the Invention

The present invention relates to a method of producing an extrusion-laminated member. Particularly, the invention relates to a method of stably forming a film of a molten resin by extrusion lamination. More particularly, the invention relates to a method forming a film suppressing the swinging of film and excessive necking during the extrusion lamination featuring an increase in the width of film on flat portions, an increase in the yield of the product and an improvement in the adhesion to the base member.

2. Prior Art

It is a widely accepted practice to coat the surfaces of a metal with a resin layer as means for imparting corrosion resistance to a metal material. The coating method employed by this technology can be represented by a method of coating the surfaces of a metal with a thermosetting resin such as epoxy resin, phenol resin, acrylic resin or polyester resin dispersed in a solvent, a method of sticking a film that has been formed in advance such as of polyester, olefinic resin or polyamide onto a metallic base member via an adhesive such as of isocyanate, epoxy or phenol, or the like method.

There has further been widely known to stick a thermoplastic resin onto a metallic base member by utilizing the heat-melt-adhering property of the thermoplastic resin. This method can be represented by a method of heat-adhering a film that has been formed in advance such as of a thermoplastic polyester onto a metal plate, or a method of sticking a thin molten film such as of a thermoplastic polyester resin that has been extruded onto a metal plate.

U.S. Pat. No. 5,407,702 (International Patent Publication No. 503378/1999) discloses a method of coating both surfaces of a metal strip while extruding a resin to form a film. According to this method, a metal strip such as of an aluminum alloy is passed through a pre-conditioner, two extrusion dies, a post-heating machine and a cooling system, thereby to coat both surfaces of the strip with a thin polyester film. According to the apparatus shown in FIG. 1 of the specification of this U.S. patent, thin polyester films extruded by the dies are spread by first rolls (drawing rolls), cooled by second rolls (contact rolls), and are press-adhered onto the heated metal strip by third rolls (laminating rolls).

The present inventors has proposed in Japanese Unexamined Patent Publication (Kokai) No. 138315/1998 a method of forming a resin coating on at least one surface of a metallic base member, i.e., a method of producing a resin/metal laminated member by arranging a metallic base member-heating zone, a die for feeding a thermoplastic resin like a film, a pair of hot laminating rolls for adhering the thermoplastic resin onto at least one surface of the metallic base member, and quick-quenching means for quickly quenching the formed laminated member along a passage of the metallic base member, conveying a molten film of the thermoplastic resin from the die by using the pair of hot laminating rolls to feed the film to a nipping position between the hot laminating rolls, and melt-adhering a thin film of the thermoplastic resin onto at least one surface of the heated metallic base member using the hot laminating rolls.

Further, Japanese Unexamined Patent Publication (Kokai) No. 100006/1999 discloses hot laminating rolls for extrusion-laminating a molten film of a thermoplastic resin that is extruded onto the surface of a metallic base member, wherein the roll of a side contacting to the molten film of the resin is an elastic roll, a portion for press-adhering the molten film of resin onto the metallic base member is heated at a temperature (T1) which is not lower than 50° C. but is lower, by 30° C., than a melting point of the thermoplastic resin, and other portions are heated at a temperature (T2) lower than the temperature (T1).

In conducting the extrusion lamination, in general, an air gap is formed between a lip portion of the T-die and a nipping portion of the laminating rolls. In the conventional extrusion lamination using a pair of laminating rolls, a limitation is imposed on decreasing the air gap due to mechanical limitation such as that a base member is fed to the nipping position of the laminating rolls in addition to feeding the molten resin film.

When the air gap increases in conducting the extrusion-lamination of a general-purpose resin having poor property of being formed into a film, both ends of the film tend to swing, i.e., selvages tend to swing toward the right and the left making it difficult to form the film. Or, even though the film could be formed by decreasing the speed of formation, the demand for forming the film at high speeds is not fulfilled.

Due to the shape memory property of the molten resin, further, there occurs excess of necking causing the width of the molten resin film to become narrow, causing the edge beads of the resin film to increase, causing the flat portion of the film to be contracted, and causing an increase in the loss of the resin.

According to the three-roll stacking system quoted above, the air gap can be decreased, but this system is not still fully satisfactory from the standpoint of producing a resin/metal laminated member of high performance maintaining high productivity. The above-mentioned prior art requires the operation for heating a metal plate prior to laminating a resin layer such as of polyester, and the operation for heating the resin/metal laminated member after the resin layer has been laminated to complete the melt-adhesion. However, the operations for heating, many times, the metal plate and the resin-coated metal plate at a temperature higher than the melting point of the polyester, cause deterioration due to heat-softening of the metal plate, heat decomposition and heat oxidation of the resin, resulting in a drop in the properties of the laminated member. The drop in the properties becomes conspicuous as the number of times of heating increases or, generally, as the thickness of the thin resin film becomes small.

In producing a resin/metal laminated member for cans, further, there remains a technical assignment in that a thin resin film must be strongly adhered maintaining a uniform thickness onto the metal plate. In the case of a film which has been biaxially stretched in advance, for example, the film can be laminated by heat-adhesion maintaining a relatively uniform thickness but must be stretched through a separate step; i.e., complex steps are required. On the other hand, the three-roll stacking system quoted above requires a cumbersome operation of cooling and forming a film while stretching the extruded molten resin into a thin film arousing such a problem that the temperature on the surface of the resin drops when it is being formed into a film making it difficult to accomplish a strong heat adhesion onto the metal plate. Besides, the resin film develops wrinkles on the third roll as the thickness of the film decreases and as the speed increases.

SUMMARY OF THE INVENTION

It is therefore an object of the present invention to provide a method of stably forming a film of a molten resin by extrusion lamination, preventing the swinging of the film and excess of necking during the extrusion lamination, increasing a width of film in the flat portion, increasing the yield of product and improving the intimate adhesion onto the base member.

Another object of the present invention is to provide a method of producing a resin/metal laminated member preventing the heat softening of the metal, ignition loss and heat oxidation of the resin as much as possible, featuring uniformity and small thickness, and excellent adhesion to the metal, maintaining a high productivity and a high production yield.

A further object of the present invention is to provide a method of producing a resin/metal laminated member useful for the cans, the resin/metal laminate that is formed being capable of withstanding such severe workings as deep-draw forming, bend-elongation working and ironing working, the formed product after worked exhibiting excellent corrosion resistance.

According to the present invention, there is provided a method of producing an extrusion-laminated member by extruding a thermoplastic resin from a T-die into the form of a film and laminating the film on a metallic base member using laminating rolls, wherein a pre-roll is disposed between the T-die and the laminating roll to receive the film on the side opposite to the side that adheres onto the base member over the whole width of the film, the film received by the pre-roll is fed to the laminating rolls, conveyed by being supported by the laminating rolls on the side opposite to the side that adheres onto the base member and is fed to a nipping position so as to be melt-adhered onto the heated metal blank.

According to the production method of the present invention, it is desired that:

1. The pre-roll is so disposed that the angle ($\theta$) of the resin film wound on the laminating roll is from 2 to 45 degrees when the resin film received by the pre-roll is fed to the laminating rolls and is conveyed by being supported thereby;
2. The film extruded from the T-die is supported so as to be wound on the pre-roll at an angle ($\alpha$) of not smaller than 10 degrees and is fed to the laminating rolls;
3. The pre-roll is disposed to rotate independently of the laminating rolls, the peripheral speed of the pre-roll being not smaller than 0.1 times but not larger than 1.0 time of the peripheral speed of the laminating rolls;
4. The pre-roll has a surface shape for reliably holding the selvages at portions corresponding to the selvages of the film;
5. The surface shape is steps or a coarse surface;
6. The pre-roll is a crown roll having a curvature;
7. The film is maintained at a temperature higher than a glass transition point (Tg) of the thermoplastic resin as measured at a position separated away from the pre-roll and on the side that adheres onto the base member;
8. The base member is fed in a direction nearly at right angles with a line connecting the centers of the pair of laminating rolls; and
9. A pair of T-dies and a pair of pre-rolls are disposed nearly symmetrically with respect to the base member to laminate the resin films on both surfaces of the base member.

BRIEF DESCRIPTION OF THE DRAWINGS

FIG. 5 is a side view illustrating the arrangement of the apparatus used in comparative Example 2;

FIG. 6 is a diagram illustrating another shape of the pre-roll used in the present invention;

FIG. 13 is a diagram illustrating another sectional structure of the pre-roll used in the present invention;

DETAILED DESCRIPTION OF THE INVENTION

[Mode of Operation]

Figure 1:
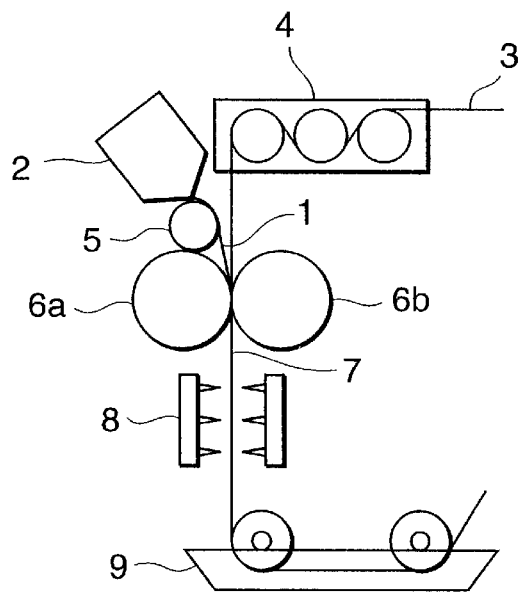
FIG. 1 is a side view illustrating an arrangement of an apparatus used for the present invention.

Referring to FIG. 1 illustrating the arrangement of the apparatus used in the present invention, the apparatus includes a T-die 2 for extruding the thermoplastic resin 1 into a film, a heating device 4 for heating a metallic base member 3, a pre-roll 5 for receiving a film 1 that is extruded on the side opposite to the side that adheres onto the base member 3 over the whole width of the film, laminating rolls 6a and 6b that receive the film 1 from the pre-roll 5, supports and conveys the film 1 to a nipping position so as to be melt-adhered onto the heated metallic base member 3, and quenchers 8 and 9 for quickly quenching a laminated member 7 that is formed.

In the present invention, a feature resides in that a pre-roll 5 is provided between the T-die 2 and the laminating rolls 6a, 6b to receive the molten resin film 1 that is melt-extruded over the whole width thereof, the pre-roll 5 being independent from the laminating rolls, i.e., being separated away from the laminating rolls.

Due to the arrangement of the pre-roll 5, the air gap can be decreased to a level close to that of when a cast film is formed.

In the present invention, it is also important that the pre-roll 5 is so disposed as to receive the film 1 on the side opposite to the side that adheres onto the base member 3.

The pre-roll 5 must exhibit two conflicting functions, i.e., a quenching function for stabilizing the film and a function for maintaining a high temperature for maintaining an adhesive force.

In the present invention, the pre-roll 5 receives the film 1 on the side opposite to the side that adheres onto the base member. Therefore, the resin film is quenched on the surface contacting to the pre-roll, the film is prevented from swinging or excess of necking is prevented during the extrusion lamination, the width of film is increased on a flat portion to enhance the yield of the product, and a drop in the resin temperature is suppressed on the surface of the film adhering onto the base member thereby to maintain a resin temperature necessary for the adhesion onto the base member.

According to the present invention, therefore, less limitation is imposed on the resin that can be applied to the extrusion lamination, and wide varieties of resins can be laminated on the base member.

In fact, when the molten resin film is supported by the pre-roll on the side that adheres onto the base member (see FIG. 4), the resin film does not intimately adhere to the metallic base member but peels by more than 50% in the grid-cut cellophane tape peeling test and, besides, develops defect during the draw-forming as demonstrated in Comparative Example 1 appearing later.

In the present invention, the resin film received by the pre-roll 5 is fed to the laminating rolls 6, and is conveyed by being supported by the laminating rolls 6 so as to be fed to a nipping position. Here, the film 1 is conveyed by being supported by the laminating rolls 6 on the side opposite to the side that adheres onto the base member 3 like in the case of the pre-roll 5, which is important for suppressing a drop in the resin temperature on the surface that adheres onto the base member and for maintaining a resin temperature necessary for the adhesion onto the base member.

According to the above-mentioned three-roll stacking system, the surfaces supported by the rolls are changed front side back at a moment when the resin film travels from the roll of the preceding stage to the next roll. According to the present invention, the film is supported by the pre-roll and by the laminating roll both on the side opposite to the side that adheres onto the base member. This combination makes it possible to effectively utilize the heat possessed by the blank and to improve properties.

That is, to prevent a drop in the properties caused by extra heating of the metallic base member and the thermoplastic resin, it is important to effectively utilize the heat possessed by the blanks. According to the present invention which employs the above-mentioned system for supporting the film, the heat possessed by the blanks can be effectively utilized.

Further, the present invention accomplishes such an effect that at least one surface of the metal blank is coated with a thermoplastic resin and that a resin/metal laminated member is produced at a high speed, the resin coating being formed of a thin film featuring high performance such as uniform thickness, high workability, high adhesion property and high film properties.

As the laminating rolls used for melt-adhering the metallic base member and the thermoplastic resin together, there have heretofore been often used cooled laminating rolls. According to the present invention, however, it is desired to use hot laminating rolls. Hot is a concept that exists between the cool and the heated, and stands for a treatment at a temperature higher than room temperature but is lower than a melting point of the thermoplastic resin. According to a preferred embodiment of the present invention, the temperature of the laminating rolls is maintained to lie within the above-mentioned range to suppress rapid transfer of heat between the rolls and the resin contacting thereto, thereby to effectively utilize heat possessed by the heated metallic base member and heat possessed by the melt-extruded resin for the heat adhesion.

In FIG. 1, attention should be given to that both the pre-roll 5 and the laminating roll 6a fed with the film from the pre-roll are both rotating in the clockwise direction. According to the present invention as described above, the pre-roll and the laminating roll served with the film from the pre-roll are both rotated in the same direction, and the film is supported and conveyed by these rolls very smoothly.

In FIG. 1, further, the metallic base member is introduced in a direction at right angles with a line connecting the laminating rolls 6a and 6b. According to the above-mentioned arrangement of the pre-roll and the laminating roll, it is allowed to dispose the pre-roll 5 close to the side of the metallic base member to suppress the occurrence of air traps on the laminating roll.

In practice, when the film 1 is supported by the pre-roll 5 on the side that adheres onto the base member and a nipping position is formed between the pre-roll 5 and the laminating roll 6a (FIG. 5), the air is trapped on the pre-roll, wrinkles occur at the nipping portion between the pre-roll and the laminating roll, and it becomes difficult to produce the laminated member as demonstrated in Comparative Example 2 appearing later.

Figure 2:
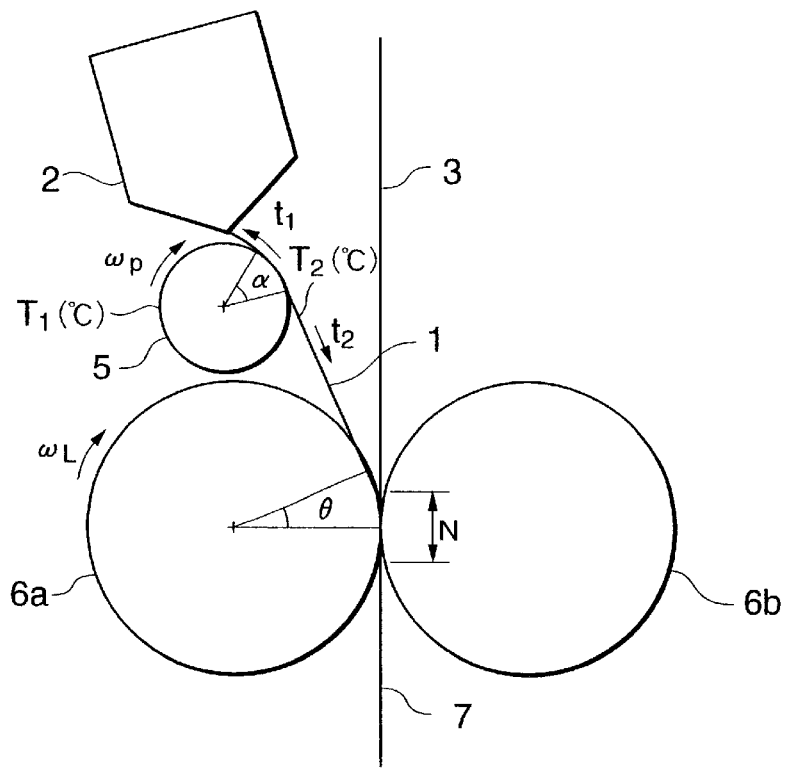
FIG. 2 is a diagram illustrating the parameters in the operation of the apparatus of FIG. 1.

Referring to FIG. 2 illustrating parameters of the operation conditions of the apparatus of FIG. 1 used in the present invention, the resin film 1 extruded from the T-die 2 comes into contact, at a winding angle $\alpha$, with the pre-roll 5 that rotates in the clockwise direction at a peripheral velocity $\omega_p$, and has a surface temperature T1 (° C.), and is fed maintaining a temperature T2 (° C.) as measured on the side that adheres onto the base member onto the laminating roll 6a, and is supported and conveyed, by a winding angle $\theta$, by the laminating roll 6a that rotates in the clockwise direction at a peripheral velocity $\omega_L$, and arrives at the nipping position where it is press-adhered onto the metallic base member.

According to the present invention, it is desired that the pre-roll 5 is so disposed that the angle ($\theta$) of the resin film wound on the laminating roll 6a is from 2 to 45 degrees and, particularly, from 2 to 30 degrees from the standpoint of producing the laminating member maintaining a favorable condition and good workability.

In this specification, the angle ($\theta$) wound on the laminating roll stands for an angle ($\theta$) subtended by a point at where the molten film of the thermoplastic resin contacts to the laminating roll 6a and by a line connecting the centers of the pair of laminating rolls with respect to the center of the laminating roll.

The nipping point is not a line but usually exists over a width N.

In the present invention, it is particularly desired that the angle $\theta$ of winding the resin on the laminating roll lies within the above-mentioned range. When the winding angle $\theta$ is larger than the above-mentioned range (see Comparative Example 3 appearing later), the air tends to be trapped on the laminating roll and wrinkles tend to develop, making it difficult to form a favorable laminated member.

Further, when the winding angle $\theta$ is larger than the above-mentioned range, the resin layer is slackened on the laminating roll causing the thickness to become irregular.

It is further desired that the film extruded from the T-die is wound on the pre-roll at an angle ($\alpha$) of not smaller than 10 degrees and, particularly, in a range of from 10 to 90 degrees from the standpoint of maintaining a balance between stabilizing the film and maintaining the resin temperature on the side that adheres onto the base member.

When the angle ($\alpha$) of winding onto the pre-roll is smaller than the above-mentioned range, the film swings and the necking increases making it difficult to obtain a favorable laminated member.

On the other hand, the upper limit of the angle of winding on the pre-roll is determined by the mechanical disposition of the pre-roll and the T-die and by the mechanical disposition of the pre-roll and the laminating roll.

According to the present invention as pointed out already, the pre-roll and the laminating roll are disposed to independently rotate from each other. Here, it is desired that the peripheral velocity ($\omega_p$) of the pre-roll is not smaller than 0.1 times but is not larger than 1.0 time and, particularly, from 0.5 to 0.8 times as great as the peripheral velocity ($\omega_L$) of the laminating roll, from the standpoint of stably forming the film.

A tension (t1) is produced in the film on the upstream side of the portion where the film is wound on the pre-roll due to the take-up ratio from the T-die depending upon the film temperature at that portion, and a tension (t2) is produced on the film on the downstream side depending upon the film temperature at that portion since the ratio of the peripheral velocities between the two is not larger than 1.0. Accordingly, a force is produced for pushing the resin film onto the pre-roll. The pushing force is intimately related to stabilizing the formation of the film.

When the ratio ($\omega_p/\omega_L$) of the peripheral velocities is not smaller than the above-mentioned range (see Comparative Example 5 appearing later), then, the tension becomes $t_2<0$, and the film slackens and selvages are wound, making it difficult to favorably carry out the lamination.

When the ratio of the peripheral velocities becomes smaller than the above-mentioned range (see Comparative Example 6 appearing later), on the other hand, the tension $t_2$ so increases that the film slips on the roll, and the selvages swing and necking increases correspondingly.

It is ideal if the take-up ratio and the film temperature are so set that $t1 \approx t2$.

In the present invention, it is desired that the temperature (T2 °C.) is maintained to be not lower than the glass transition point (Tg) of the thermoplastic resin as measured at a position separated away from the pre-roll and on the side that adheres onto the base member, from the standpoint of suppressing the occurrence of wrinkles on the resin film and improving intimate adhesion between the metallic base member and the resin film.

When the temperature (T2) becomes lower than the above-mentioned range (see Comparative Example 9 appearing later), wrinkles develop on the resin film, and adhesion to the metallic base member decreases.

In the present invention, it is desired that the metallic base member is fed in a direction nearly at right angles with a line connecting the centers of the pair of laminating rolls from the standpoint of improving intimate adhesion of the resin film onto the metallic base member.

When the metallic base member is fed not at right angles but in an inclined manner (FIG. 14), the metallic base member comes into contact with the laminating roll at a position other than the nipping position, whereby the temperature of the base member drops and the resin film loses adhesion as demonstrated in Comparative Example 10 appearing later.

[Pre-roll]

It is desired that the pre-roll 5 used in the present invention has a surface shape for reliably holding the selvages at portions corresponding to the selvages of the film, from the standpoint of reliably supporting the selvages of the film by the pre-roll and of improving the stability in forming the film.

In the casting technology, in general, there is used a casting roll having mirror surface-finished portions that come in contact with the selvages and a coarse-surface portion that comes in contact with the central portion of the film. This is to stably quench the selvage portions by sticking the selvage portions onto the roll so that the air will not be trapped in the central portion of the film.

On the selvage-contacting portions of the casting roll or on the plain roll, however, the film tends to slip due to the adhesion of oligomer from the resin film. It is therefore necessary to form the surface of the roll in a shape to lock the film, so that the film will not be affected by the oligomer adhering on the roll.

Though there is no particular limitation, the shape of the surface for reliably holding the selvages of the film is generally steps or a coarse surface.

The steps prevent the selvages of the film from necking the central portion. Further, a coarse surface creates a frictional resistance to suppress the slipping and necking of the film on the roll.

Selvages of the film can further be held by providing the portions of the rolls contacting to the selvages with suction holes.

It is further allowable to employ an air-clipping system by blowing the air or an electrostatic pinning system which is a known art by itself or together with the above-mentioned shape.

Though there is no limitation on their shapes and values, these methods will now be described.

Figure 3:
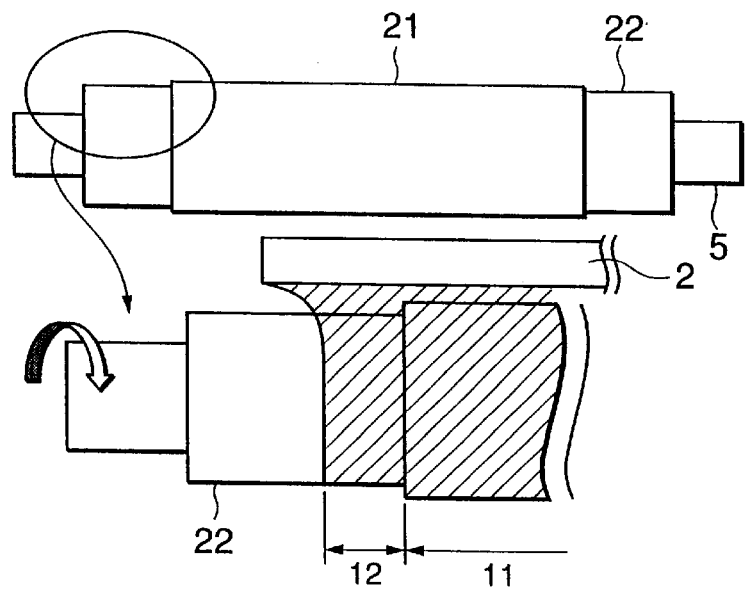
FIG. 3 is a diagram illustrating the shape of a pre-roll used in the present invention.

Referring to FIG. 3 illustrating the shape of surface of the pre-roll 5 used in the present invention, the pre-roll 5 has a large-diameter portion 21 at the center and small-diameter portions 22 on both sides thereof in the axial direction. The molten resin film 1 extruded from the T-die 2 has a flat portion 11 of which the central portion has a nearly constant thickness in the direction of width thereof, and has selvages 12 having a thickness that increases like a bead at the ends on both sides thereof in the direction of width.

According to the present invention, the selvages 12 of the film are received by the small-diameter portion 22 of the pre-roll 5, and the flat portion 11 of the film is received by the large-diameter portion 21, whereby the selvages 12 are prevented from necking the central portion due to the steps of the pre-roll, and the film is reliably supported. Besides, the selvages 12 are quenched being at least received by the small-diameter portions 22, and the film is formed maintaining an increased stability.

The step (D1–D2)/2 between the large-diameter portion 21 (diameter: D1) and the small-diameter portion 22 (diameter: D2) is such that the selvages are reliably held, and is, generally, from 0.05 to 1.5 mm and, particularly, from 0.1 to 1.0 mm.

Figure 9:
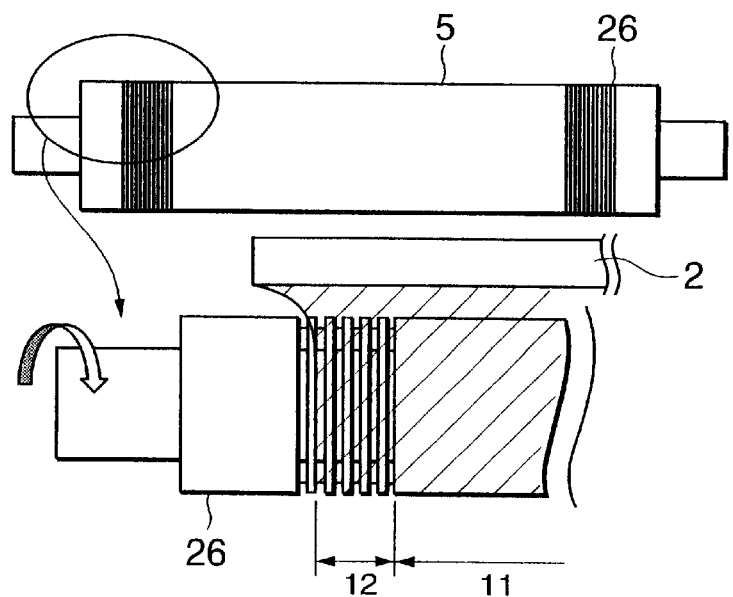
FIG. 9 is a diagram illustrating a yet further shape of the pre-roll used in the present invention.

Referring to FIG. 9 illustrating another shape of the surface of the pre-roll 5 used in the present invention, the pre-roll 5 has slit-like grooves 26 formed at the ends on both sides thereof in the axial direction.

In this embodiment, too, the selvages 12 of the molten resin 1 extruded from the T-die 2 are received by the slit-like grooves 26 of the pre-roll 5, and the flat portion 11 of the film is received by an ordinary surface of the roll. Thus, the film is reliably supported by the pre-roll, and is formed maintaining an improved stability.

The slit-like grooves in the pre-roll of FIG. 9 usually have a width of from about 0.1 to about 3 mm and a pitch of the grooves of, suitably, from 1 to 10 mm in the axial direction.

Further, the slit may be of a spiral shape having a depth of grooves and pitch of groove within the above-mentioned ranges.

Figure 11:
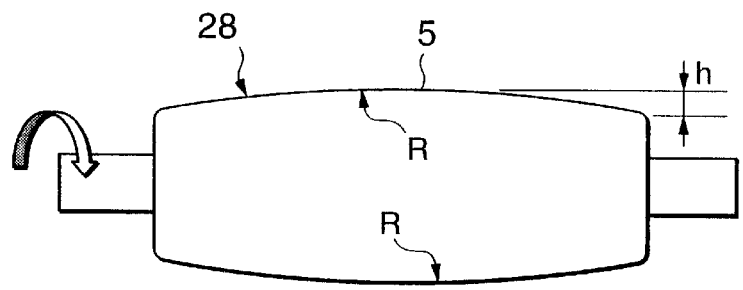
FIG. 11 is a diagram illustrating a pre-roll of the type of a crown roll used in the present invention.

Referring to FIG. 11 illustrating a further shape of surface of the pre-roll 5 used in the present invention, the pre-roll 5 is a crown roll having such a curved surface 28 that the central portion in the axial direction has a large diameter, and the diameter gradually decreases toward both sides.

In this embodiment, too, the selvages 12 of the molten resin film 1 extruded from the T-die 2 are received by the small-diameter portions on both sides of the crown roll, and the flat portion 11 of the film is received by the central large-diameter portion. Thus, the film is reliably supported by the pre-roll, and is formed maintaining an improved stability.

Suitably, the curved portion of the pre-roll of FIG. 11 has a height (h), usually, in a range of from about 1.0 to about 10 mm.

Referring to FIG. 6 illustrating another shape of surface of the pre-roll 5 used in the present invention, the pre-roll 5 has coarse surface portions 23 at the ends on both sides thereof in the axial direction.

In this embodiment, too, the selvages 12 of the molten resin film 1 extruded from the T-die 2 are received by the coarse-surface portions 23 of the pre-roll 5, and the flat portion 11 of the film is received by the ordinary roll surface. Thus, the film is reliably supported by the pre-roll, and the film is formed maintaining an improved stability.

It is desired that the coarse surface portions 23 of the pre-roll of FIG. 6 has a center line average coarseness (Ra) under JIS B 0601 of from 1.0 to 15 µm and, particularly, from 2 to 10 µm. The coarse surfaces can be formed by means which has been known per se. such as the sand-blasting method.

Figure 8:
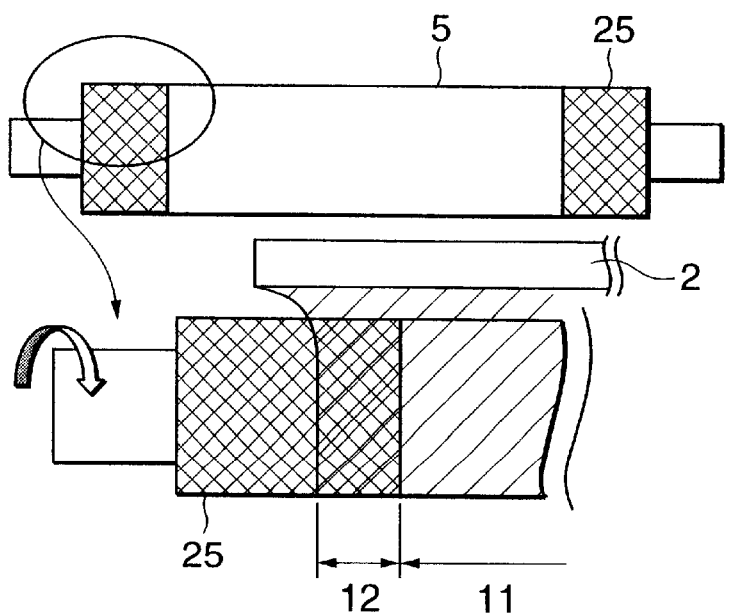
FIG. 8 is a diagram illustrating a still further shape of the pre-roll used in the present invention.

Referring to FIG. 8 illustrating a further shape of surface of the pre-roll 5 used in the present invention, the pre-roll 5 has portions 25 of intersecting knurled grooves at the ends on both sides thereof in the axial direction.

In this embodiment, too, the selvages 12 of the molten resin film 1 extruded from the T-die 2 are received by the knurled groove portions 25 of the pre-roll 5, and the flat portion 11 of the film is received by the ordinary roll surface 24. Thus, the film is reliably supported by the pre-roll, and is formed maintaining an improved stability.

In the pre-roll of FIG. 8, the knurled grooves have a depth of, generally, from about 0.1 to about 1.0 mm, and a pitch among the grooves of from 0.5 to 3 mm.

Figure 7:
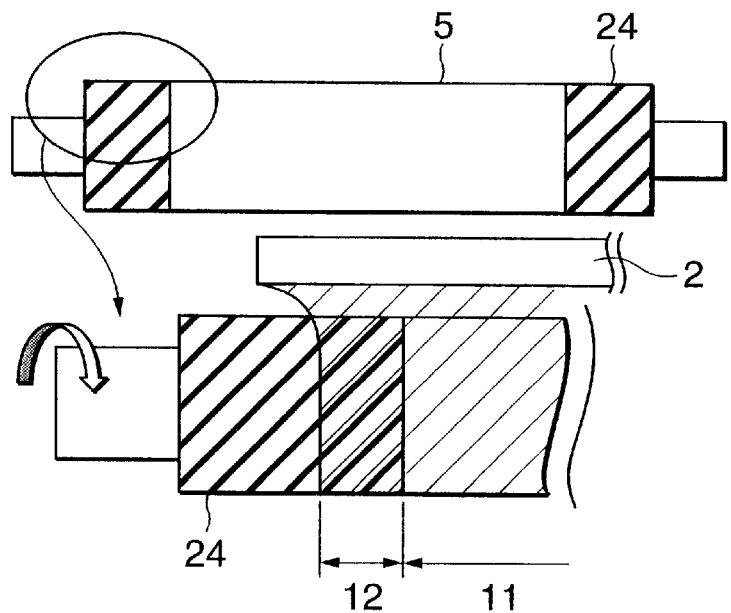
FIG. 7 is a diagram illustrating a further shape of the pre-roll used in the present invention.

Referring to FIG. 7 illustrating a still further shape of surface of the pre-roll 5 used in the present invention, the pre-roll 5 has belt-like spiral portions 24 having coarse surfaces at the ends on both sides thereof in the axial direction.

In this embodiment, too, the selvages 12 of the molten resin film 1 extruded from the T-die 2 are received by the spiral coarse surface portions 24 of the pre-roll 5, and the flat portion 11 of the film is received by the ordinary roll surface. Thus, the film is reliably supported by the pre-roll, and is formed maintaining an improved stability.

The surface coarseness of the spiral portions 24 of the pre-roll of FIG. 7 may lie over the same range as the one described with reference to FIG. 6, and it is desired that the belt of the coarse surface portion has a width of, generally, from 1 to 10 mm and a pitch of spiral of from 1 to 10 mm. Further, the spiral portions may be in the form of a head band having a band width and a pitch lying within the above-mentioned ranges.

Figure 10:
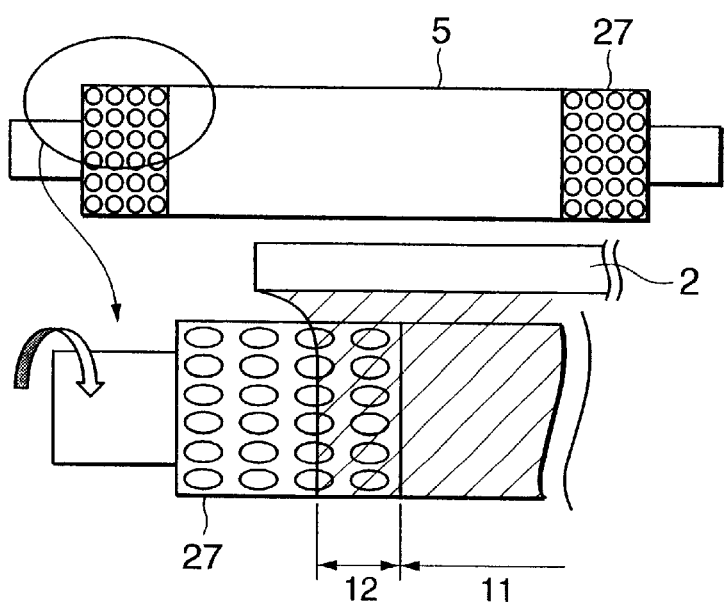
FIG. 10 is a diagram illustrating a further shape of the pre-roll used in the present invention.

Referring to FIG. 10 illustrating a further shape of surface of the pre-roll 5 used in the present invention, the pre-roll 5 has porous suction portions 27 at the ends on both sides thereof in the axial direction. The apertures in the porous suction portions 27 are communicated with a suction passage running through the interior of the roll.

In this embodiment, too, the selvages 12 of the molten resin film 1 extruded from the T-die 2 are received by the suction portions 27 of the pre-roll 5, and the flat portion 11 of the film is received by the ordinary roll surface. Thus, the film is reliably supported by the pre-roll, and is formed maintaining an improved stability.

The aperture area ratio in the porous suction portion 27 of the pre-roll of FIG. 10 is, generally, from about 5 to about 30%, and the degree of pressure reduction is from about 1 to 50 mmH$_2$O (absolute). It is, however, desired that the pressure is reduced little with an area ratio which is as small as possible.

When a mirror surface-finished metal roll of which the whole surfaces are plated with chromium is used as a pre-roll (see Comparative Example 7 appearing later), the film slips on the pre-roll, necking increases, the film swings, and it becomes difficult to conduct the laminating operation. As shown in FIG. 3 and FIGS. 6 to 11, however, the film can be formed maintaining markedly increased stability upon forming a surface shape at the portions corresponding to the selvages of the film to reliably hold the selvages.

In the present invention, a mirror surface-finished metal roll of which the whole surfaces are plated with chromium can be used as the pre-roll as far as the surface shape is formed at the portions corresponding to the selvages of the film to reliably hold the selvages.

It is, of course, allowable to use a pre-roll provided with a heat-insulating rubber layer on the whole surfaces thereof to substitute for the metal roll. A tube of an inert resin such as a fluorine-contained resin can be adhered onto the whole surfaces of the rubber layer. There can be further used a pre-roll provided on the whole surfaces thereof with a heat-insulating ceramic layer. In these cases, too, the surface shape must be provided at the portions corresponding to the selvages of the film for reliably holding the selvages as shown in FIG. 3 and FIGS. 6 to 11.

Figure 12:
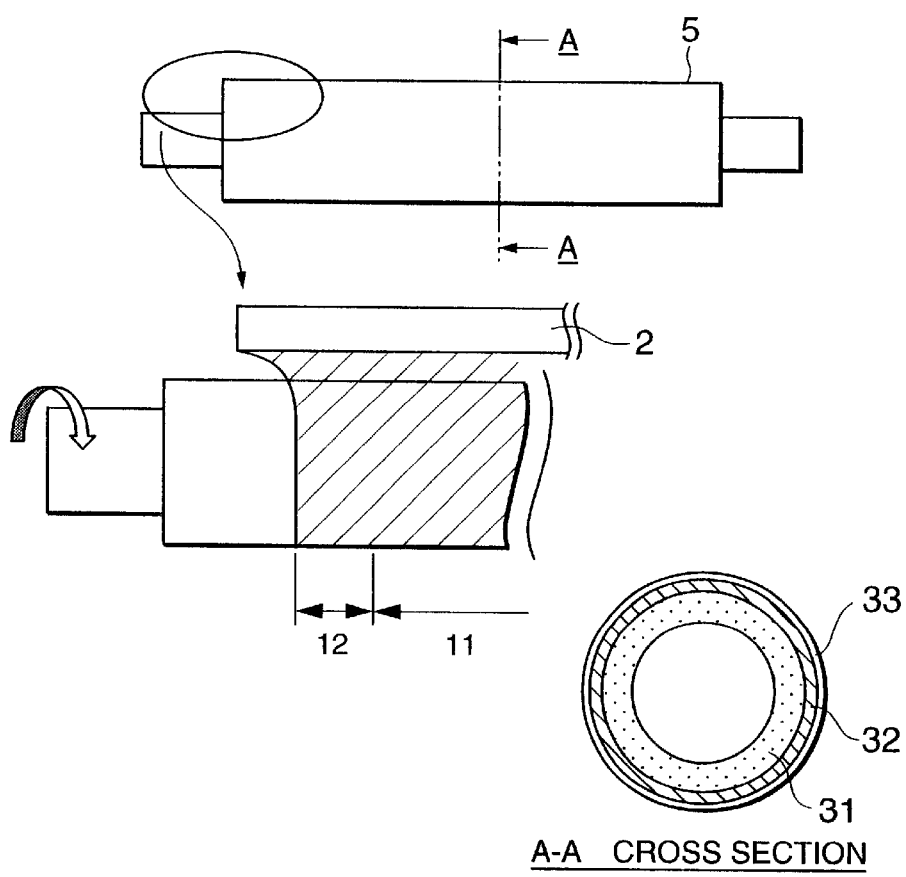
FIG. 12 is a diagram illustrating the sectional structure of the pre-roll used in the present invention.

FIG. 12 illustrates a constitution of the pre-roll formed of the elastic member. An iron core 31 of the roll is surrounded by a heat-insulating rubber layer 32, and a covering 33 of a fluorine-contained resin tube is formed thereon.

By using the elastic roll as a pre-roll that comes into contact with a molten resin film, it is allowed to suppress the conduction of heat from the molten resin film to the pre-roll, to suppress the drop of temperature of the molten resin film of the side adhering onto the metallic base member, and to enhance the adhesive force between the metallic basic member and the resin film.

Referring to FIG. 13, further, use is made of a roll of which the portion contacting to the flat portion of the film is the same as that of FIG. 12, but which is provided with heat-conducting materials 31 at only those portions coming into contact with the selvages of the film. This makes it possible to quench the selvages only of the film, to prevent the selvages of the resin film from being wound on the pre-roll, and to maintain the pre-roll at a higher temperature. This enhances the intimately adhering force between the metallic base member and the resin film.

[Laminating Rolls]

In the present invention, it is desired that the laminating rolls 6a and 6b have the shape and are made of a material same as those taught in Japanese Unexamined Patent Publication No. 100006/1999.

As the laminating rolls, however, it is desired to use elastic rolls described with reference to FIG. 12.

That is, the elastic rolls make it possible to prevent a drop in the temperature caused by the conduction of heat and to maintain a predetermined nipping width (width in the circumferential direction of the roll) between the laminated blank that is formed and the rolls by utilizing the cushioning property and elasticity. Maintaining the nipping width is effective in enhancing the intimate adhesion between the metallic base member and the resin film.

By using an elastic roll, further, the pushing force of the roll is uniformly transmitted over the whole width of the laminate; i.e., a laminate is formed having a uniform thickness in the direction of width and exhibiting a nearly uniform adhesive force in the direction of width.

When an elastic roll is used as a pre-roll or a laminating roll, it is desired that the elastic material (rubber) constituting the elastic roll exhibits excellent parting property and excellent resistance against the heat. As such a rubber, there can be exemplified a silicone rubber (Q) and a fluorine-contained rubber (FKM). However, the fluorine-contained rubber is particularly preferred. When a thermally shrinking fluorine-contained resin tube is used, it is desired to use a silicone rubber from the standpoint of adhesiveness between the rubber and the fluorine-contained resin tube.

The fluorine-contained rubbers exhibit excellent resistance against the heat. Suitable examples of the fluorine-contained rubber include the one of the vinylidene fluoride type, the one of the tetrafluoroethylene-hexafluoropropylene type, the one of the tetrafluoroethylene-perfluoromethylvinyl ether type, the one of the fluorosilicon type, and the one of the fluorophosphazine type, to which only, however, the fluorine-contained rubber is in no way limited.

As the silicone rubber, there can be used the one having polydimethyloxane, polymethylphenylsiloxane or polydiphenylsiloxane as a constituent unit.

As required, these rubbers are used together with a reinforcing agent such as carbon black, white carbon, and filler.

It is desired that the elastic material has a hardness (JIS) of generally over a range of from 50° to 90° and, particularly, from 60° to 90° and that the layer of the elastic material has a thickness of from 1 to 30 mm.

[Metal Blank]

In the present invention, various surface-treated steel plates, light metal plates such as of aluminum, or foils thereof can be used as a metal base member.

As the surface-treated steel plate, there can be used the one obtained by subjecting a cold-rolled steel plate to the temper-rolling after annealed or to the secondary cold-rolling, followed by one, two or more kinds of surface treatments such as zinc plating, tin plating, nickel plating, electrolytic chromate treatment and chromate treatment. A suitable example of the surface-treated steel plate is an electrolytic chromate-treated steel plate having a metal chromium layer in an amount of from 10 to 200 mg/m$^2$ and a chromium oxide layer in an amount of from 1 to 50 mg/m$^2$ (reckoned as metal chromium). This surface-treated steel plate exhibits film adhesion property and corrosion resistance in combination. Another example of the surface-treated steel plate is a hard tin plate having a tin plating in an amount of from 0.6 to 11.2 g/m$^2$. It is desired that the tin plate has been subjected to the chromate treatment or to the chromate/phosphate treatment such that the amount of chromium is from 1 to 30 mg/m$^2$ (reckoned as metal chromium).

As another example, there can be used an aluminum-coated steel plate plated with aluminum or on which aluminum is press-adhered.

As the light metal plate, there is used a so-called pure aluminum plate as well as other aluminum alloy plate. The aluminum alloy plate having excellent corrosion resistance and workability has a composition of from 0.2 to 1.5% by weight of manganese, from 0.8 to 5% by weight of magnesium, from 0.25 to 0.3% by weight of zinc, from 0.16 to 0.26% by weight of copper, and the rest being aluminum. It is desired that even this light metal plate has been subjected to the chromate treatment or to chromate/phosphate treatment such that the amount of chromium is from 20 to 300 mg/m$^2$ reckoned as metal chromium.

The thickness of the metal plate may differ depending upon the kind of the metal, use or size of the laminated member, but is, usually, from 0.10 to 0.50 mm. It is, however, desired that the thickness is from 0.10 to 0.30 mm in the case of the surface-treated steel plate and is from 0.15 to 0.40 mm in the case of the light metal plate.

Though not generally needed, the metal blank can, as required, be provided with an adhesive primer which exhibits excellent adhesiveness to both the metal blank and to the thermoplastic resin. A typical primer coating material exhibiting excellent adhesiveness and corrosion resistance is a phenol epoxy coating material comprising a resol-type phenolaldehyde resin derived from various phenols and formaldehyde and a bisphenol-type epoxy resin. Particularly, the primer coating material contains the phenol resin and the epoxy resin at a weight ratio of from 50:50 to 5:95 and, particularly, at a weight ratio of from 40:60 to 10:90. The adhesive primer layer is formed maintaining a thickness of, generally, from 0.3 to 5 µm.

[Thermoplastic Resin]

Any thermoplastic resin can be used provided it can be molded by extrusion to form a film. Examples include polyolefins such as a random or a block copolymer of α-olefins, like low-density polyethylene, high-density polyethylene, polypropylene, poly-1-butene, poly-4-methyl-1-pentene or ethylene, propylene, 1-butene, 4-methyl-1-pentene; ethylene/vinyl compound copolymers such as ethylene/vinyl acetate copolymer, ethylene/vinyl alcohol copolymer, and ethylene/vinyl chloride copolymer; styrene resins such as polystyrene, acrylonitrile/styrene copolymer, ABS, and α-methylstyrene/styrene copolymer; polyvinyl compounds such as vinyl polychloride, polyvinylidene chloride, vinyl chloride/vinylidene chloride copolymer, methyl polyacrylate and methyl polymethacrylate; polyamides such as nylon 6, nylon 6-6, nylon 6-10, nylon 11 and nylon 12; thermoplastic polyesters such as polyethylene terephthalate and polybutylene terephthalate; polycarbonate; polyphenylene oxide; or mixtures thereof.

As a thermoplastic resin that is particularly preferred from the standpoint of film properties, workability and corrosion resistance, there can be exemplified a thermoplastic polyester or a copolymerized polyester, a blend thereof, or laminated layers thereof. It is particularly preferred to use a polyester comprising an ethylene terephthalate unit as a chief component.

As the starting polyester, the polyethylene terephthalate itself can be used. It is, however, desired to lower the degree of maximum crystallization that is reached by the film from the standpoint of accomplishing shock resistance and workability of the laminated member. For this purpose, it is recommended to introduce a copolymerized ester unit other than the ethylene terephthalate into the polyester.

It is particularly desired to use a copolymerized polyester comprising chiefly an ethylene terephthalate unit containing other ester units in small amount and having a melting point of from 210 to 252° C. The melting point of the homopolyethylene terephthalate is generally from 255 to 265° C.

It is generally desired that not less than 70 mol % and, particularly, not less than 75 mol % of the dibasic acid component in the copolymerized polyester is a terephthalic acid component, not less than 70 mol % and, particularly, not less than 75 mol % of the diol component is an ethylene glycol, from 1 to 30 mol % and, particularly, from 5 to 25 mol % of the dibasic acid component and/or the diol component is a dibasic acid component other than the terephthalic acid and/or a diol component other than the ethylene glycol.

As the dibasic acid other than the terephthalic acid, there can be exemplified an aromatic dicarboxylic acid such as isophthalic acid, phthalic acid or naphthalenedicarboxylic acid; alicyclic dicarboxylic acid such as cyclohexanedicarboxylic acid; or aliphatic dicarboxylic acid such as succinic acid, adipic acid, sebacic acid or dodecanedioic acid, which may be used in one kind or in a combination of two or more kinds. As the diol component other than the ethylene glycol, there can be exemplified propylene glycol, 1,4-butane diol, diethylene glycol, 1,6-hexylene glycol, cyclohexane dimethanol, and ethylene oxide adduct of bisphenol A, which may be used in one kind or in two or more kinds. A combination of these comonomers must be such that the melting point of the copolymerized polyester lies within the above-mentioned range, as a matter of course. It is also allowable to use polyfunctional monomers such as trimellitic acid, pyromellitic acid and pentaerythritol in combination.

The polyester that is used must have a molecular weight large enough for forming a film. For this purpose, it is desired that the polyester has an intrinsic viscosity (I.V.) over a range of from 0.55 to 1.9 dl/g and, particularly, from 0.65 to 1.4 dl/g.

The film of the thermoplastic resin may contain an inorganic filler (pigment) for the purpose of concealing the metal plate and for assisting the transmission of the blank-holding force to the metal plate during the draw-redraw working. Further, the film may be blended with blending agents that have been known per se., such as antiblocking agent as represented by amorphous silica, various antistatic agents, lubricant, antioxidizing agent and ultraviolet ray-absorbing agent according to recipe known per se.

As the inorganic filler, there can be exemplified inorganic white pigments such as rutile-type or anatase-type titanium dioxide, zinc flower and Cloth White; white extender pigments such as barite, precipitated barite sulfate, calcium carbonate, gypsum, precipitated silica, aerosil, talc, fired or unfired clay, barium carbonate, alumina white, synthetic or natural mica, synthetic calcium silicate and magnesium carbonate; black pigments such as carbon black and magnetite; red pigments such as red iron oxide, etc.; yellow pigments such as sienna, etc.; and blue pigments such as ultramarine, cobalt blue, etc. These inorganic fillers can be blended in an amount of from 10 to 500% by weight and, particularly, from 10 to 300% by weight per the resin.

[Other Production Conditions]

In the present invention, it is desired to heat the metallic base member at Tm (the melting point of the thermoplastic resin)–80° C. or Tm+50° C. and, particularly, at Tm–50° C. to Tm+30° C. (temperature of just before entering into the laminating rolls). The metallic base member can be heated by heating means that has been known per se., such as heating by flowing an electric current, high-frequency induction heating, heating by infrared rays, hot-air heating, heating by a roller, etc.

When the heating temperature is lower than the above range, the adhering force is not sufficient. When the heating temperature is not lower than the above range, on the other hand, the metal tends to be softened.

As the die for extruding the thermoplastic resin, there can be used the die that is usually used for extrusion-coating the resin, such as coat hanger-type die, fish tail-type die or straight manifold-type die. The thermoplastic resin is heated and kneaded in an extruder at a temperature higher than a melting point thereof, and is extruded through the die.

It is also possible to extrude the thermoplastic resin as laminated layers. In this case, use is made of extruders of a number corresponding to the number of the layers of the resin to be laminated, and the resin is extruded through a multiplex multi-layer die.

In extruding the thermoplastic resin, the die lip has a width of suitably from 0.3 to 2 mm.

According to the present invention, it is desired to decrease the thickness of the molten film of the thermoplastic resin while maintaining the peripheral velocity of the laminating rolls from 10 to 150 times as great and, particularly, from 20 to 130 times as great as the velocity of extruding the thermoplastic resin from the die. Within this range, irregular mechanical adjustment such as die lip width is corrected, and the thin film possesses a uniform thickness and is stably laminated. When this ratio exceeds the above range, the resin tends to be broken, which is not desirable. When the ratio is lower than the above range, on the other hand, the lamination is not stably conducted and, besides, the film is not formed having a sufficiently decreased thickness.

On the other hand, the peripheral velocity of the pre-roll is maintained at the above-mentioned ratio with respect to the peripheral velocity of the laminating rolls.

When the laminated member is used for producing cans, it is desired that the ratio (tM/tR) of the thickness (tM) of the metallic base member to the thickness (tR) of the resin film on one surface is from 2 to 150 from the standpoint of workability for producing the cans and maintaining characteristics of the cans.

It is desired that the contacting width (nipping width) at the nipping position of the laminating rolls is in a range of from 1 to 50 mm from the standpoint of intimately and firmly adhering the metallic base member and the thermoplastic resin together. When this width is smaller than the above range, a sufficiently long contacting time is not obtained, and the film exhibits defective surface state and defective adhesion. When the width is greater than the above range, it becomes difficult to increase the nipping pressure, or the laminated member is excessively quenched during the nipping area and loses the adhesive force.

It is desired that the nipping pressure is in a range of from 1 to 100 kgf/cm$^2$.

To maintain the above-mentioned nipping width, it is desired that either one of the laminating rolls is an elastic roll.

It is further desired that the laminating rolls have a surface temperature which is not lower than room temperature but is not higher than the melting point (Tm) of the thermoplastic resin and, particularly, from 50° C. to Tm (the melting point of the thermoplastic resin) –30° C. The temperature can be adjusted by a known method such as passing a liquid medium having a constant temperature through the rolls or by bringing the temperature-controlled back-up rolls into contact with the laminating rolls.

It is desired that the heat-adhered laminated member is quickly quenched immediately after being laminated in order to prevent the heat crystallization or the deterioration by heat, or is quickly quenched after maintained at that temperature for a given period of time but before arriving at the crystallization temperature zone in order to prevent the heat crystallization. It is desired that the laminated member is quenched as quickly as possible. The quenching is effected by blowing the cold air, by spraying the cooling water 8 (FIG. 1), by immersing in the cooling water 9 (FIG. 1), or by bringing the laminated member into contact with the cooling roller.

The present invention can be adapted to forming a resin coating layer on at least one surface of the metallic base member and is, preferably, adapted to laminating a resin film on both surfaces of the metallic base member.

Figure 15:
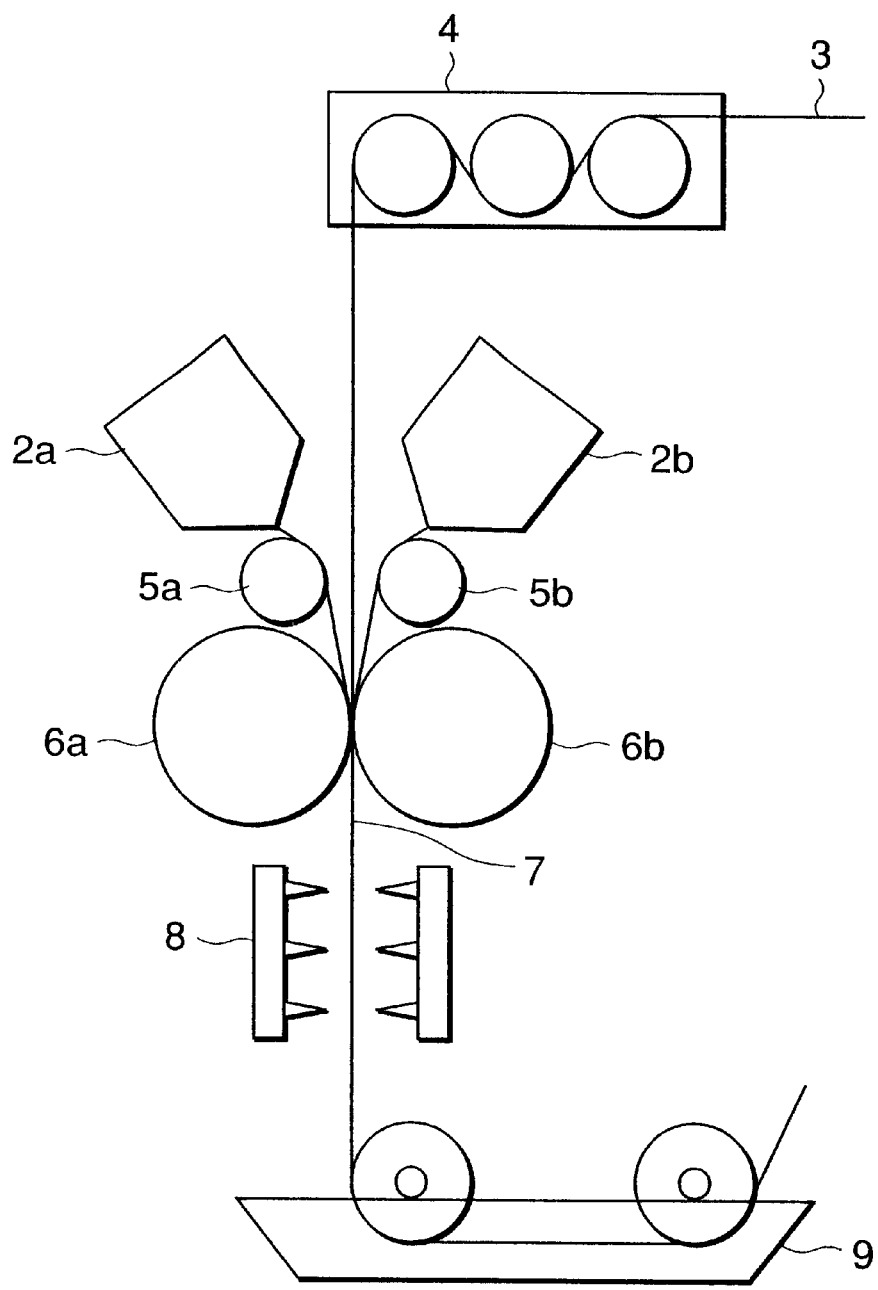
FIG. 15 is a side view illustrating another arrangement of the apparatus used in the present invention.

Referring to FIG. 15 illustrating a concrete embodiment, the heated metallic base member 3 is fed in a direction nearly at right angles with a line connecting the centers of a pair of laminating rolls 6a and 6b, a pair of T-dies 2a, 2b and a pair of pre-rolls 5a, 5b are symmetrically arranged with respect to the base member 3, and the resin films are laminated on both surfaces of the base member, and the thus formed laminated member 7' is quickly quenched.

EXAMPLES

The invention will now be described in further detail by way of working examples.

Example 1

By using the apparatus of a constitution shown in FIG. 1, an isophthalic acid-copolymerized polyethylene terephthalate (PET/IA) resin film having a melting point (Tm) of 220° C. was extruded from a T-die at a temperature of 260° C., once supported by a pre-roll disposed between the T-die and the laminating rolls, fed into the laminating rolls, laminated onto a TFS coil member heated at 245° C. at a speed of 100 meters a minute, quickly quenched through the water shower, and passed through a step of slightly trimming both sides of the coil thereby to obtain a resin-coated laminated member.

The base member was supplied in a direction nearly at right angles with a line connecting the centers of the pair of laminating rolls, the pre-roll received the film over its whole width on the side opposite to the side that adheres onto the base member, the winding angle ($\alpha$) of the resin film on the pre-roll was 45°, and the winding angle ($\theta$) of the resin on the laminating roll was 10°.

The peripheral velocity ($\omega_p$) of the pre-roll was 0.7 times as great as the peripheral velocity ($\omega_L$) of the laminating rolls (see FIG. 2).

The pre-roll was a mirror surface-finished metal roll of which the whole surface was plated with chromium as shown in FIG. 3, and possessed small-diameter portions that come into contact with the selvages of the film and a large-diameter portion that comes into contact with the film other than the selvages, forming steps. The temperature (T1) on the surface of the pre-roll was adjusted to be about 160° C., and the temperature (T2) of the film just after having passed through the pre-roll was about 180° C.

The swinging of selvages and the necking were suppressed, and a wide resin film could be fed to the laminating rolls.

Further, variation due to the slipping of the resin film on the pre-roll could be avoided. There was obtained the laminated member without trapping the air on the laminating rolls or without developing wrinkles, and having a film of a uniform thickness laminated on the whole surface of the base member.

The thus obtained resin film-laminated member was rolled by a roller up to a nominal distortion ($\epsilon$) of 250%, and the surface thereof was cut like a grid of squares of 2 mm over an area of 20 mm high and 20 mm wide by using a cutter knife available in the market. Then, the peeling test was conducted by sticking a Scotch brand tape having a width of 25 mm (manufactured by Sumitomo 3M Co.) thereon and then peeled it off to examine the adhesion strength.

Further, the forming test was conducted by applying a wax-type lubricating agent onto the resin film-laminated member, punching the member into a disk 150 mm in diameter, and draw-forming the disk into a container having a diameter of 92 mm in a customary manner.

As a result, the peeling ratio at $\epsilon=250\%$ was as good as not larger than 10%. The resin film-laminated member remained favorable even in the forming test without developing such defect as peeling.

The results obtained were as shown in Table 1.

Comparative Example 1

Figure 4:
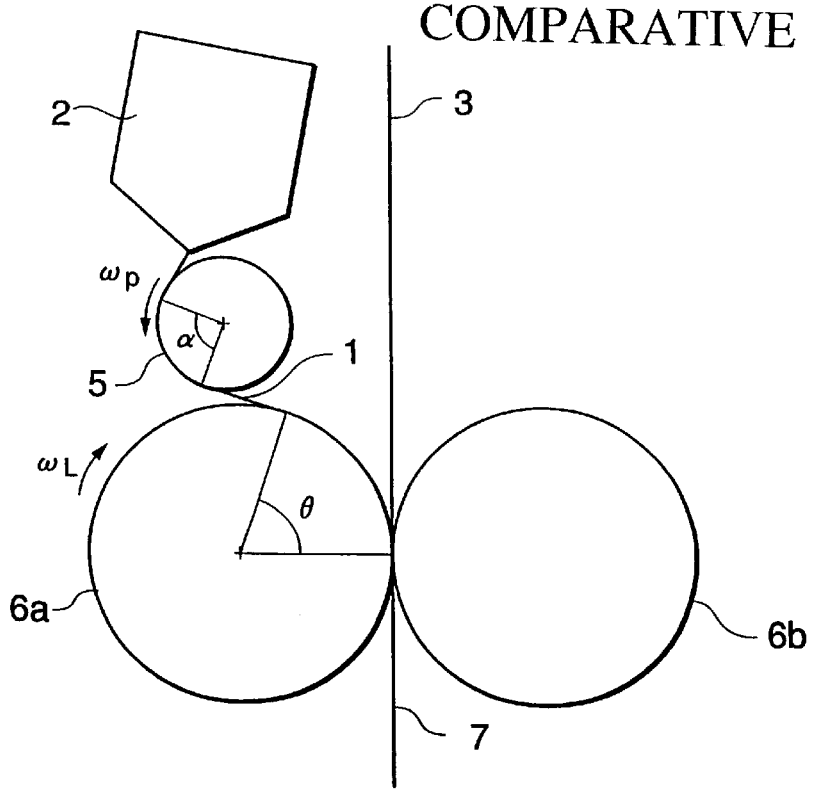
FIG. 4 is a side view illustrating the arrangement of the apparatus used in Comparative Example 1.

A laminated member was prepared under the same conditions as those in Example 1 but so disposing the pre-roll as to support the resin film on the side that comes into contact with the base member as shown in FIG. 4. Through the peeling test at $\epsilon=250\%$, the peeling ratio was not smaller than 50% and the adhesion to the base member was decreased. This was probably due to that the film comes in contact with the pre-roll on the side that adheres onto the base member, and the temperature drops on the surface on the side that adheres onto the base member and the surface is wet on the side that adheres onto the base member.

Comparative Example 2

It was attempted to prepare a laminated member under the same conditions as those in Example 1 but supporting the resin film by the pre-roll on the side that comes into contact with the base member and bringing the pre-roll into nipping with the laminating roll. Due to the nipping between the pre-roll and the laminating roll, however, the air was trapped on the pre-roll, and wrinkles developed in the nipping portion between the pre-roll and the laminating roll. During the lamination on the base member, therefore, wrinkles developed and the air was trapped, and the laminated member could not be obtained.

Comparative Example 3

It was attempted to prepare a laminated member under the same conditions as those in Example 1 but so disposing the pre-roll that winding angle ($\theta$) of the resin on the laminating roll was 50°. However, the air was trapped by the resin film on the pre-roll, the thickness became irregular, and wrinkles developed making it difficult to prepare a good laminated member.

Comparative Example 4

It was attempted to prepare a laminated member under the same conditions as those in Example 1 but setting the winding angle ($\alpha$) of the resin film on the pre-roll to be 5°. However, since no force was produced for locking the resin film on the pre-roll, the resin film slipped on the pre-roll producing large necking and permitting selvages to swing, making it difficult to prepare a laminated member.

Comparative Example 5

It was attempted to prepare a laminated member under the same conditions as those in Example 1 but setting the peripheral velocity ($\omega_p$) of the pre-roll to be 1.1 times as great as the peripheral velocity ($\omega_L$) of the laminating roll. However, the resin film was slackened between the pre-roll and the laminating roll, and wrinkles developed and the air was trapped in the laminated member. Besides, the selvages were wound on the pre-roll, and the laminated member could not be formed.

Comparative Example 6

It was attempted to prepare a laminated member under the same conditions as those in Example 1 but setting the peripheral velocity of the pre-roll to be 0 times ($\omega_p$=0) of the peripheral velocity of the laminating roll. However, the resin film slipped on the pre-roll producing large necking and permitting selvages to swing, making it difficult to prepare a laminated member.

Example 2

A laminated member was prepared under the same conditions as those in Example 1 but using a pre-roll having selvage-contacting portions of a surface coarseness Ra (pear skin) of about 5 to 6 $\mu$m (Rmax of about 50 $\mu$m) as shown in FIG. 6. As a result, there was obtained a wide laminated member having excellent properties like those of Example 1.

Example 3

A laminated member was prepared under the same conditions as those in Example 1 but using a pre-roll having selvage-contacting portions that are of a band-like spiral shape having a surface coarseness Ra (pear skin) of about 5 to 6 $\mu$m (Rmax of about 50 $\mu$m) and a width of about 5 mm as shown in FIG. 7. As a result, there was obtained a wide laminated member having excellent properties like those of Example 1.

Example 4

A laminated member was prepared under the same conditions as those in Example 1 but using a pre-roll having selvage-contacting portions of a knurled shape as shown in FIG. 8. As a result, there was obtained a wide laminated member having excellent properties like those of Example 1.

Example 5

A laminated member was prepared under the same conditions as those in Example 1 but using a pre-roll having selvage-contacting portions of slit-like grooves of a width of 3 mm as shown in FIG. 9. As a result, there was obtained a wide laminated member having excellent properties like those of Example 1.

Example 6

A laminated member was prepared under the same conditions as those in Example 1 but using a pre-roll having selvage-contacting portions with apertures capable of sucking the air from the inside of the roll as shown in FIG. 10. As a result, there was obtained a wide laminated member having excellent properties like those of Example 1.

Example 7

A laminated member was prepared under the same conditions as those in Example 1 but using a pre-roll which was a crown roll with a curved barrel portion as shown in FIG. 11. As a result, there was obtained a wide laminated member having excellent properties like those of Example 1.

Example 8

A laminated member was prepared under the same conditions as those in Example 1 but arranging, as shown in FIG. 12, a heat-insulating rubber on the whole surface of the pre-roll, adhering a tube of a fluorine-contained resin onto the whole surface of the roll, and imparting a shape of any one of Examples 1 to 7 thereto. The temperature (T1) on the surface of the pre-roll was maintained to be about 160° C., and the temperature (T2) of the film just after having passed through the pre-roll was about 180° C. As a result, there was obtained a wide laminated member having excellent properties like those of Example 1.

Comparative Example 7

It was attempted to prepare a laminated member under the same conditions as those in Example 1 but using a mirror surface-finished metal roll of which the whole surface had been uniformly plated with chromium. However, the resin film slipped on the pre-roll producing large necking and permitting selvages to swing, making it difficult to prepare a laminated member.

Comparative Example 8

It was attempted to prepare a laminated member under the same conditions as those in Example 1 but arranging a heat-insulating rubber on the whole surface of the pre-roll and adhering a tube of a fluorine-contained resin onto the whole surface of the roll so as to form a uniform roll surface. However, the resin film slipped on the pre-roll producing large necking and permitting selvages to swing, making it difficult to prepare a laminated member.

Comparative Example 9

It was attempted to prepare a laminated member under the same conditions as those in Example 1 but adjusting the temperature (T1) on the surface of the roll to be about 50° C. and setting the film temperature (T2) just after having passed through the pre-roll to be 60° C. which was not higher than the glass transition point (Tg) of the thermoplastic resin. However, wrinkles developed on the resin film between the pre-roll and the laminating roll, and the air was trapped by the laminated member. A portion without wrinkles or air entrapping was selected and was put to the peeling test. The peeling ratio at $\epsilon$=250% was not smaller than 50%, and the adhesion to the base member was small.

Comparative Example 10

Figure 14:
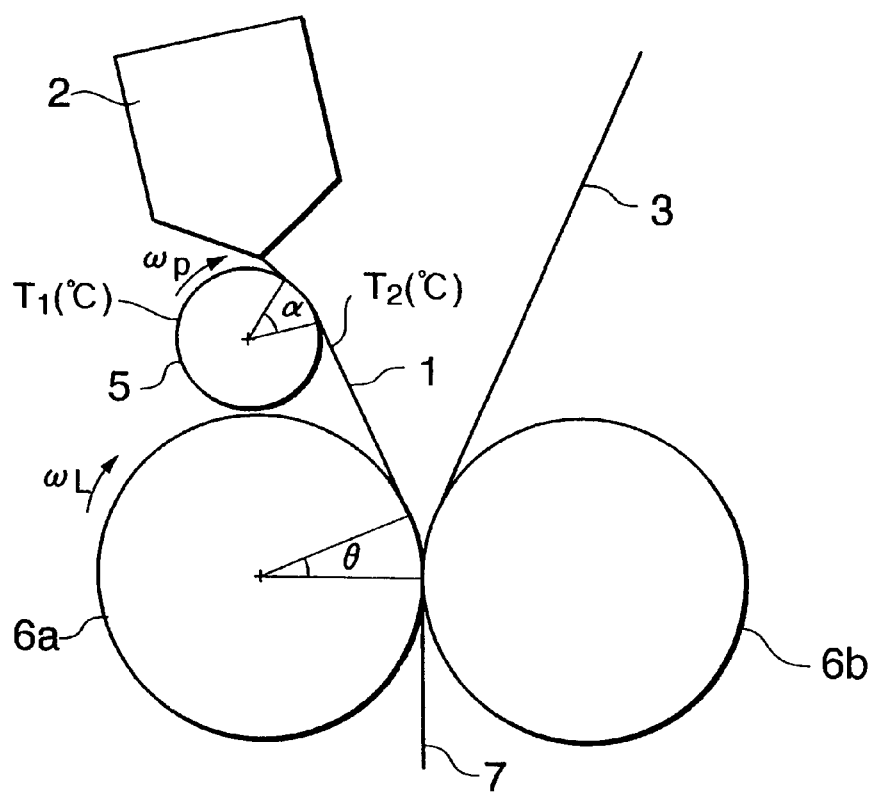
FIG. 14 is a side view illustrating the arrangement of the apparatus used in Comparative Example 10.

A laminated member was prepared under the same conditions as those in Example 1 but laminating, as shown in FIG. 14, a resin film on one surface of the base member by feeding the base member from an inclined direction relative to a line connecting the centers of the pair of laminating rolls and by using a pre-roll of any one of Examples 1 to 8. As a result, there was obtained a wide laminated member having a uniform film thickness on the whole surface of the base member by using the pre-roll of any form. Upon feeding the base member from an inclined direction, however, the film was wound on the laminating roll at some winding angle, and the temperature of the base member has dropped and the adhesive force of the resin film to the base member has decreased, too. In the peeling test at $\epsilon$=250%, the peeling ratio was not smaller than 50%. In the forming test, the laminated member developed such defect as peeling.

Example 9

A laminated member was prepared under the same conditions as those in Example 1 but laminating, as shown in FIG. 15, resin films on both surfaces of the base member by feeding the base member from a direction nearly at right angles with a line connecting the centers of the pair of laminating rolls and by disposing a pair of T-dies and a pair of pre-rolls nearly symmetrically with respect to the base member, the pre-rolls being any one of those of Examples 1 to 8. As a result, there was obtained a wide laminated member having a uniform film thickness on the whole surface of the base member by using the pre-rolls of any form. In the peeling test at $\epsilon=250\%$, the peeling ratio was as good as not larger than 10%. In the forming test, the resin film-laminated member remained favorable without developing such defect as peeling.

TABLE 1

| | Winding angle on laminating roll | Pre-roll | | | | Temperature | | |
| --- | --- | --- | --- | --- | --- | --- | --- | --- |
| | | Winding angle | Peripheral velocity (lam. R = 1.0) | Material | Selvage shape, structure | Roll surface (T1) | Resin film (T2) | Remarks |
| Ex. 1 | 10 | 45 | 0.7 | chrome plating (metal) | with steps | 160 | 180 | |
| Comp. Ex. 1 | 10 | 45 | 0.7 | chrome plating (metal) | with steps | — | — | adhering surface supported |
| Comp. Ex. 2 | 10 | 45 | 1.0 | chrome plating (metal) | with steps | — | — | nipping with laminating roll |
| Comp. Ex. 3 | 50 | 45 | 0.7 | chrome plating (metal) | with steps | — | | |
| Comp. Ex. 4 | 10 | 5 | 0.7 | chrome plating (metal) | with steps | — | — | |
| Comp. Ex. 5 | 10 | 45 | 1.1 | chrome plating (metal) | with steps | — | — | |
| Comp. Ex. 6 | 10 | 45 | 0 | chrome plating (metal) | with steps | — | | |
| Ex. 2 | 10 | 45 | 0.7 | chrome plating (metal) | pear-skin | 160 | 180 | |
| Ex. 3 | 10 | 45 | 0.7 | chrome plating (metal) | pear-skin belt-like spiral | 160 | 180 | |
| Ex. 4 | 10 | 45 | 0.7 | chrome plating (metal) | knurled | 160 | 180 | |
| Ex. 5 | 10 | 45 | 0.7 | chrome plating (metal) | slit-like grooves | 160 | 180 | |
| Ex. 6 | 10 | 45 | 0.7 | chrome plating (metal) | sucking apertures | 160 | 180 | |
| Ex. 7 | 10 | 45 | 0.7 | chrome plating (metal) | polished | 160 | 180 | crown roll |
| Ex. 8 | 10 | 45 | 0.7 | rubber + F-contained tube | Ex. 1–7 | 160 | 180 | |
| Comp. Ex. 7 | 10 | 45 | 0.7 | chrome plating (metal) | none | 160 | 180 | |
| Comp. Ex. 8 | 10 | 45 | 0.7 | rubber + F-contained tube | none | 160 | 180 | |
| Comp. Ex. 9 | 10 | 45 | 0.7 | chrome plating (metal) | with steps | 50 | 60 | |
| Comp. Ex. 10 | 10 | 45 | 0.7 | chrome plating (metal) | Ex. 1–8 | 160 | 180 | laminated on one surface, passed aslant |
| Ex. 9 | 10 | 45 | 0.7 | chrome plating (metal) | Ex. 1–8 | 160 | 180 | laminated on both surfaces, passed vertically |

| | Evaluation | | | | |
| --- | --- | --- | --- | --- | --- |
| | | Srate of | Peeling test ($\epsilon = 250\%$) | | Forming |
| | State of film | laminate | Peeling ratio (%) | Evaluation | text |
| Ex. 1 | ○ | ○ | 10 or less | ○ | ○ |
| Comp. Ex. 1 | ○ | ○ | 50 or more | X | X |
| Comp. Ex. 2 | X (air trapped, wrinkled) | X | — | — | — |
| Comp. Ex. 3 | X (air trapped, wrinkled) | X | — | — | — |
| Comp. Ex. 4 | X (selvages swing, large necking) | X | — | — | — |
| Comp. Ex. 5 | X (film slackens, selvages are wound) | X | — | — | — |
| Comp. Ex. 6 | X (selvages swing, large necking) | X | — | — | — |
| Ex. 2 | ○ | ○ | 10 or less | ○ | ○ |
| Ex. 3 | ○ | ○ | 10 or less | ○ | ○ |
| Ex. 4 | ○ | ○ | 10 or less | ○ | ○ |

TABLE 1-continued

| | | | | | |
|---|---|---|---|---|---|
| Ex. 5 | ○ | ○ | 10 or less | ○ | ○ |
| Ex. 6 | ○ | ○ | 10 or less | ○ | ○ |
| Ex. 7 | ○ | ○ | 10 or less | ○ | ○ |
| Ex. 8 | ○ | ○ | 10 or less | ○ | ○ |
| Comp. Ex. 7 | X (selvages swing, large necking) | — | — | — | — |
| Comp. Ex. 8 | X (selvages. swing, large necking) | — | — | — | — |
| Comp. Ex. 9 | X (wrinkled) | X | 50 or more | X | — |
| Comp. Ex. 10 | ○ | ○ | 50 or more | X | X |
| Ex. 9 | ○ | ○ | 10 or less | ○ | ○ |

Note:
○; good
X; bad

According to the present invention, there is provided a method of producing an extrusion-laminated member by extruding a thermoplastic resin from a T-die into the form of a film and laminating the film on a metallic base member using laminating rolls, wherein a pre-roll is disposed between the T-die and the laminating roll to receive the film on the side opposite to the side that adheres onto the base member over the whole width of the film, the film received by the pre-roll is fed to the laminating rolls, conveyed by being supported by the laminating rolls on the side opposite to the side that adheres onto the base member and is fed to a nipping position so as to be melt-adhered onto the heated metal blank, stabilizing the film of amolten resin by extrusion lamination, preventing the swinging of the film and excess of necking during the extrusion lamination, increasing a width of film in the flat portion, increasing the yield of product and improving the intimate adhesion onto the base member. Further, a resin/metal laminated member is produced preventing the heat softening of the metal, ignition loss and heat oxidation of the resin as much as possible, featuring uniformity and small thickness, and excellent adhesion to the metal, maintaining a high productivity and a high production yield.

Further, the resin/metal laminate that is formed is capable of withstanding such severe workings as deep-draw forming, bend-elongation working and ironing working, and the formed product after worked exhibits excellent corrosion resistance.

What is claimed is:

1. A method of producing an extrusion-laminated member by extruding a thermoplastic resin from a T-die into the form of a film and laminating the film on a heated metallic base member using laminating rolls, wherein a pre-roll is disposed between the T-die and one of said laminating rolls to receive the film on the side opposite to the side that adheres onto the base member over the whole width of the film, the film received by the pre-roll is fed to the laminating rolls, conveyed by being supported by the laminating rolls on the side opposite to the side that adheres onto the base member and is fed to a nipping position so as to be melt-adhered onto the heated metal member, wherein the film extruded from the T-die is supported so as to be wound on the pre-roll at an angle (α) in a range of from 10 to 90 degrees and is fed to the laminating rolls.

2. A method of producing an extrusion-laminated member according to claim 1, wherein the pre-roll is so disposed that the angle (θ) of the resin film wound on the laminating roll is from 2 to 45 degrees when the resin film received by the pre-roll is fed to the laminating rolls and is conveyed by being supported thereby.

3. A method of producing an extrusion-laminated member according to claim 1, wherein the pre-roll is disposed to rotate independently of the laminating rolls, the peripheral speed of the pre-roll being not smaller than 0.1 times but not larger than 1.0 time of the peripheral speed of the laminating rolls.

4. A method of producing an extrusion-laminated member according to claim 1, wherein the film has selvages and the pre-roll has a surface shape for reliably holding the selvages at portions corresponding to the selvages of the film.

5. A method of producing an extrusion-laminated member according to claim 4, wherein the surface shape is steps or a coarse surface.

6. A method of producing an extrusion-laminated member according to claim 1, wherein the pre-roll is a crown roll having a curvature.

7. A method of producing an extrusion-laminated member according to claim 1, wherein the film is maintained at a temperature higher than a glass transition point (Tg) of the thermoplastic resin as measured at a position separated away from the pre-roll and on the side that adheres onto the base member.

8. A method of producing an extrusion-laminated member according to claim 1, wherein said laminating rolls comprise a pair of laminating rolls each having a center and the base member is fed in a direction nearly at right angles with a line connecting the centers of the pair of laminating rolls.

9. A method of producing an extrusion-laminated member according to claim 8, wherein a pair of T-dies and a pair of pre-rolls are disposed nearly symmetrically with respect to the base member to laminate the resin films on both surfaces of the base member.

* * * * *